(12) United States Patent
Hagenow

(10) Patent No.: US 7,140,481 B2
(45) Date of Patent: Nov. 28, 2006

(54) CLUTCH PISTON AMPLIFIER ASSEMBLY

(75) Inventor: Paul Hagenow, Goffstown, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 146 days.

(21) Appl. No.: 10/876,800

(22) Filed: Jun. 25, 2004

(65) Prior Publication Data

US 2005/0284724 A1    Dec. 29, 2005

(51) Int. Cl.
*F16D 25/0638*    (2006.01)
(52) U.S. Cl. .................. 192/85 AA; 188/72.4
(58) Field of Classification Search .......... 192/85 AA; 475/146
See application file for complete search history.

(56) References Cited

U.S. PATENT DOCUMENTS 3,612,237 A * 10/1971 Honda .................. 192/85 AA
5,439,427 A * 8/1995 Enokido et al. ............ 477/130
5,701,976 A * 12/1997 Kumagai et al. .......... 188/71.5
5,950,787 A * 9/1999 Murasugi et al. ....... 192/85 AA

FOREIGN PATENT DOCUMENTS

JP    57-140919 A  *  8/1982

* cited by examiner

*Primary Examiner*—Richard M. Lorence
(74) *Attorney, Agent, or Firm*—Ronald W. Wangerow; Harness, Dickey & Pierce, P.L.C.

(57) ABSTRACT

A clutch piston amplifier assembly is provided for applying pressure to a clutch pack for engaging a first member and second member of an automatic transmission. The clutch piston amplifier assembly utilizes an amplifier piston which applies a secondary force to an apply piston for increasing the amount of apply force that can be obtained from the clutch assembly without increasing the diameter of the apply piston or the line pressure supplied to the piston assembly.

7 Claims, 5 Drawing Sheets

US 7,140,481 B2

CLUTCH PISTON AMPLIFIER ASSEMBLY

FIELD OF THE INVENTION

The present invention relates to a clutch assembly, and more particularly, to a clutch having a piston amplifier assembly.

BACKGROUND OF THE INVENTION

Clutch assemblies have been used in automatic transmissions for vehicles for many years. As illustrated in FIG. 6, the typical clutch design 110 includes a first member 112 and a second member 114 rotatable relative to the first member. A clutch pack 116 including at least one first clutch disk 118 attached to the first member 112 and at least one second clutch disk 120 attached to the second member 114 is provided for selectively, frictionally engaging the first and second members 112, 114. In an automotive transmission, the first and second members 112, 114 can be any one of a rotating shaft, gears, and planetary gearing system components, or a fixed non-rotatable member, such as a housing. In a typical friction clutch assembly, an apply piston 122 is disposed in a fluid chamber 124 for selectively applying axial pressure on the clutch pack 116. A return spring mechanism 126 typically in the form of a spring pack, wave spring, or Bellville spring is used to apply a biasing force against the apply piston to bias the apply piston to a disengaged position. The input into the system is hydraulic pressure delivered to the piston chamber 124 and acting directly on the apply piston 122. The apply piston 122 translates toward the friction plates 118, 120 coming into contact with the plates and applying pressure thereto. The pressure applied to the friction plates 118, 120 increases and eventually causes the rotation of the component for which the system is design to engage.

The apply piston pressure must overcome the force of the return spring 126 in order to apply pressure to the clutch pack. The return spring's main function is to return the apply piston into the disengaged position from which it came after the apply pressure has dissipated in order to disengage the clutch.

The apply pressure applied to the clutch pack is dependent upon the fluid line pressure generated by the pump of a hydraulically controlled transmission and the surface area of the apply piston. Because of the space constraints on the design of a transmission, the size of the apply piston is greatly limited. Similarly, the pump of the hydraulically controlled transmission may also be limited due to size and weight requirements. Accordingly, it is desirable to provide a clutch design that increases the apply forces achievable with the clutch without greatly affecting the size of the system or requiring increased line pressure.

SUMMARY OF THE INVENTION

The present invention provides a clutch assembly having a clutch piston amplifier assembly for applying pressure to the clutch pack. The clutch piston amplifier assembly is disposed in a piston chamber and includes an apply piston operable for applying axial pressure to the clutch pack and an amplifier piston operable for applying axial pressure to the apply piston for amplifying the amount of pressure applied to the clutch pack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
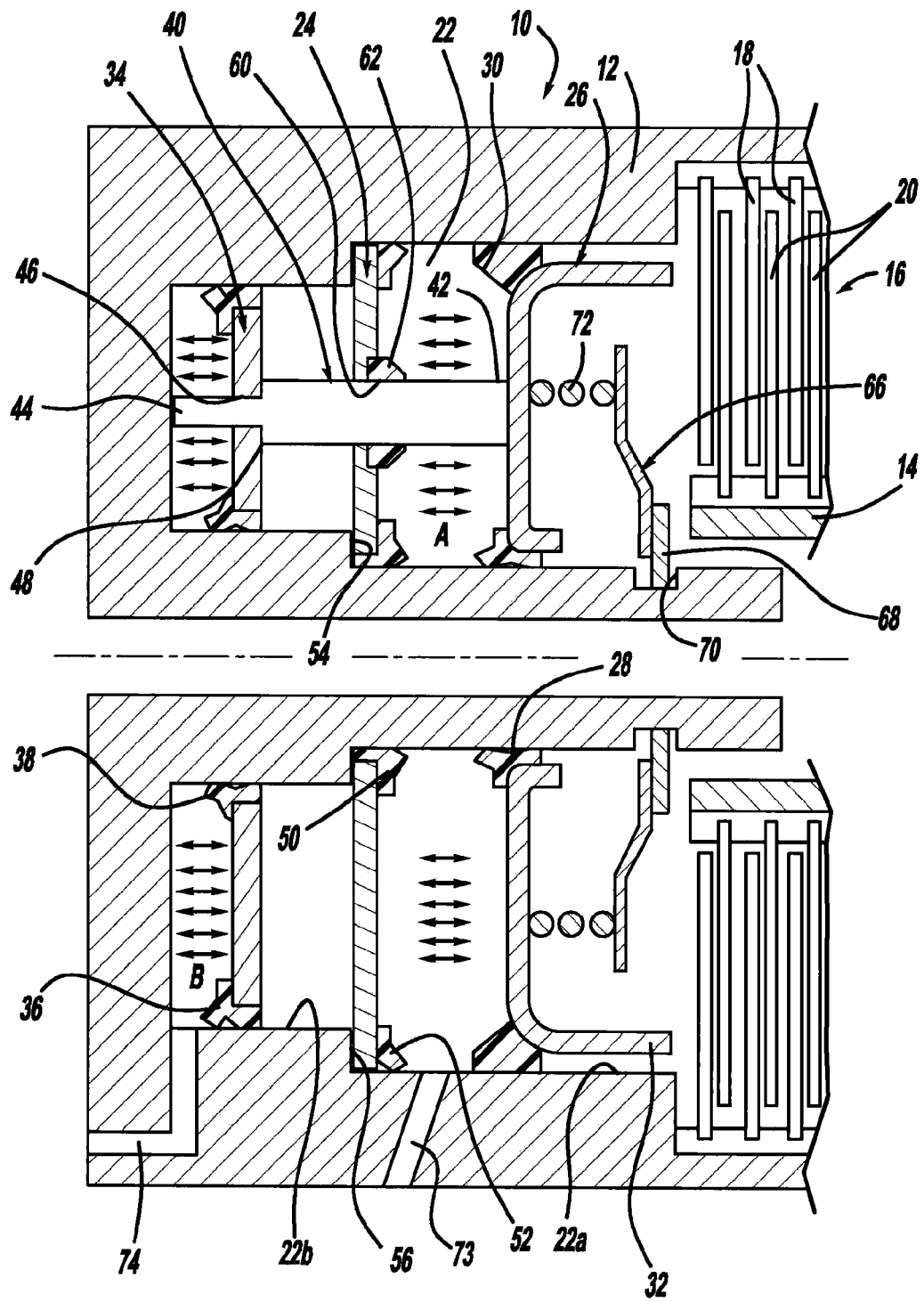
FIG. 1 is a partial cross-sectional view of a clutch piston amplifier assembly according to the principles of the present invention.

With reference to FIG. 1, the clutch assembly 10, according to the principles of the present invention, will now be described. The clutch assembly 10 includes a first member 12 and a second member 14 rotatable relative to the first member 12. A clutch pack 16 includes a plurality of clutch plates 18 having external splines which engage internal splines of the first member 12 and a plurality of clutch plates 20 having internal splines connected to external splines of rotational second member 14. The first member 12 defines a piston chamber 22 having a first chamber portion 22a and a second chamber portion 22b. A stage separator plate 24 is provided between the first chamber portion 22a and the second chamber portion 22b. An apply piston 26 is disposed in the first chamber portion 22a of the piston chamber 22 and includes an inner diameter seal 28 engaging an inner diameter surface of the piston chamber 22. An outer diameter seal 30 is provided on an outer diameter portion of the piston 26 and engages an outer diameter surface of the piston chamber 22. The apply piston 26 includes an axially extending arm portion 32 which engages the clutch pack 16 for applying axial pressure thereto, as will be described in greater detail herein.

Figure 2:
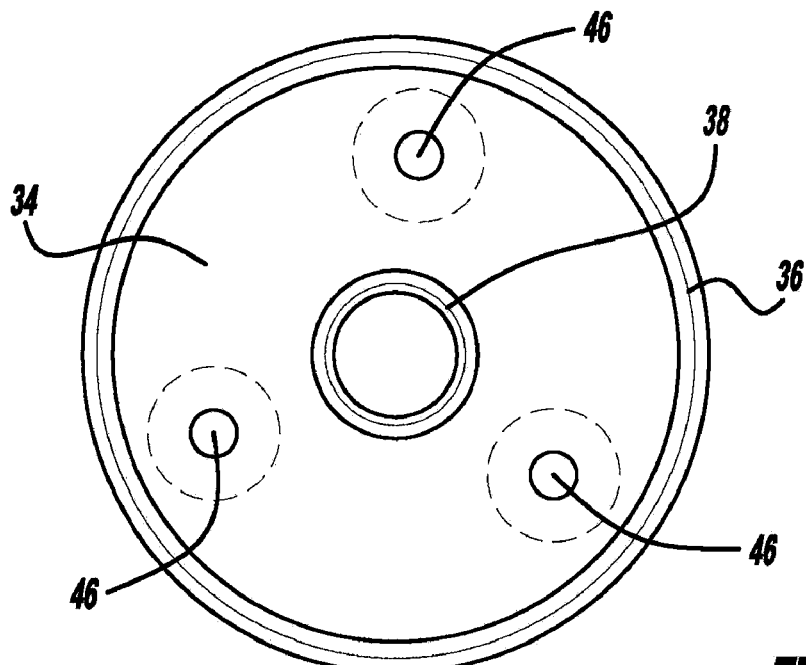
FIG. 2 is a plan view of an amplifier plate piston according to the principles of the present invention.

An amplifier piston 34 is provided in the second chamber portion 22b of the piston chamber 22 and includes an outer diameter seal 36 which engages an outer diameter surface of the piston chamber 22 and an inner diameter seal 38 which engages an inner diameter surface of the piston chamber 22. A plurality of amplifier drive pins 40 are provided in engagement with the apply piston 26 and the amplifier piston 34. As shown in FIG. 2, preferably, three or more amplifier drive pins 40 are provided equally spaced around the annular shaped piston chamber so as to have a first end 42 engaging the first piston 26 and having a second end with a reduced diameter portion 44 slidably received in respective apertures 46 provided in the amplifier piston 34. The reduced diameter portion 44 of the amplifier drive pins 40 is slidable relative to the amplifier piston 34 with the amplifier piston 34 abutting against a shoulder 48 of the amplifier drive pin 40.

Figure 3:
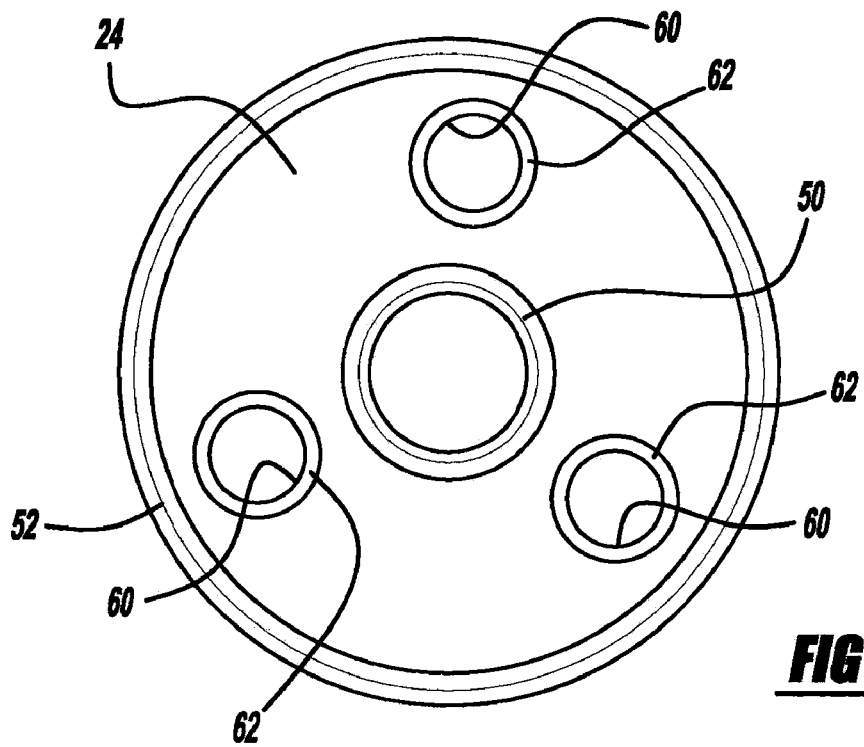
FIG. 3 is a plan view of a separator plate according to the principles of the present invention.

The stage separator plate 24 includes an inner diameter seal 50 engaging an inner diameter surface of the piston chamber 22 and an outer diameter seal 52 engaging an outer diameter surface of the piston chamber 22. An inner diameter shoulder 54 and an outer diameter shoulder 56 are provided between the first chamber portion 22a and second chamber portion 22b with the stage separator plate 24 abutting against the inner diameter shoulder 54 and outer diameter shoulder 56. The amplifier drive pins 40 extend through respective apertures 60 (best shown in FIG. 3) provided through the stage separator plate 24 and include a drive pin seal 62 providing a sealed relationship between the stage separator plates 24 and movable amplifier drive pins 40.

A spring retainer plate 66 is provided between the first piston 26 and the clutch pack 16 and is secured in place by a retaining ring 68 which is received in a groove 70 provided in the first rotatable member 12. A return spring assembly 72 is disposed between the first piston 26 and retainer plate 66 for applying a return force to the first piston 26. The piston chamber 22 is provided with a first pressurized fluid inlet port 73 which communicates with an apply piston volume A and a second pressurized fluid supply inlet 74 in communication with a second amplifier plate piston volume B.

During operation, pressurized fluid is applied to the apply piston volume A for applying pressure within the first chamber portion 24a against the apply piston 26. Pressure is also introduced through the second inlet 74 to the amplifier plate piston volume B within the second chamber portion 22b for applying axial pressure on the amplifier piston 34. The amplifier piston 34 acts against the shoulder 48 of the amplifier drive pins 40 which impart an additional axial force against the apply piston 26 for amplifying the apply pressure that is applied to the clutch pack 16 by the apply piston 26.

It should be understood by one of ordinary skill in the art that the supply of pressurized fluid to the first and second inlet ports 73, 74 can be selective so that hydraulic pressure can be applied to either apply chamber A, B, individually, or in combination to apply a range of apply pressures to the clutch pack 16.

It should be understood that the amplifier drive pins 40 can be provided as separate members or affixed to the first piston 26 so as to be movable therewith.

Figure 4:
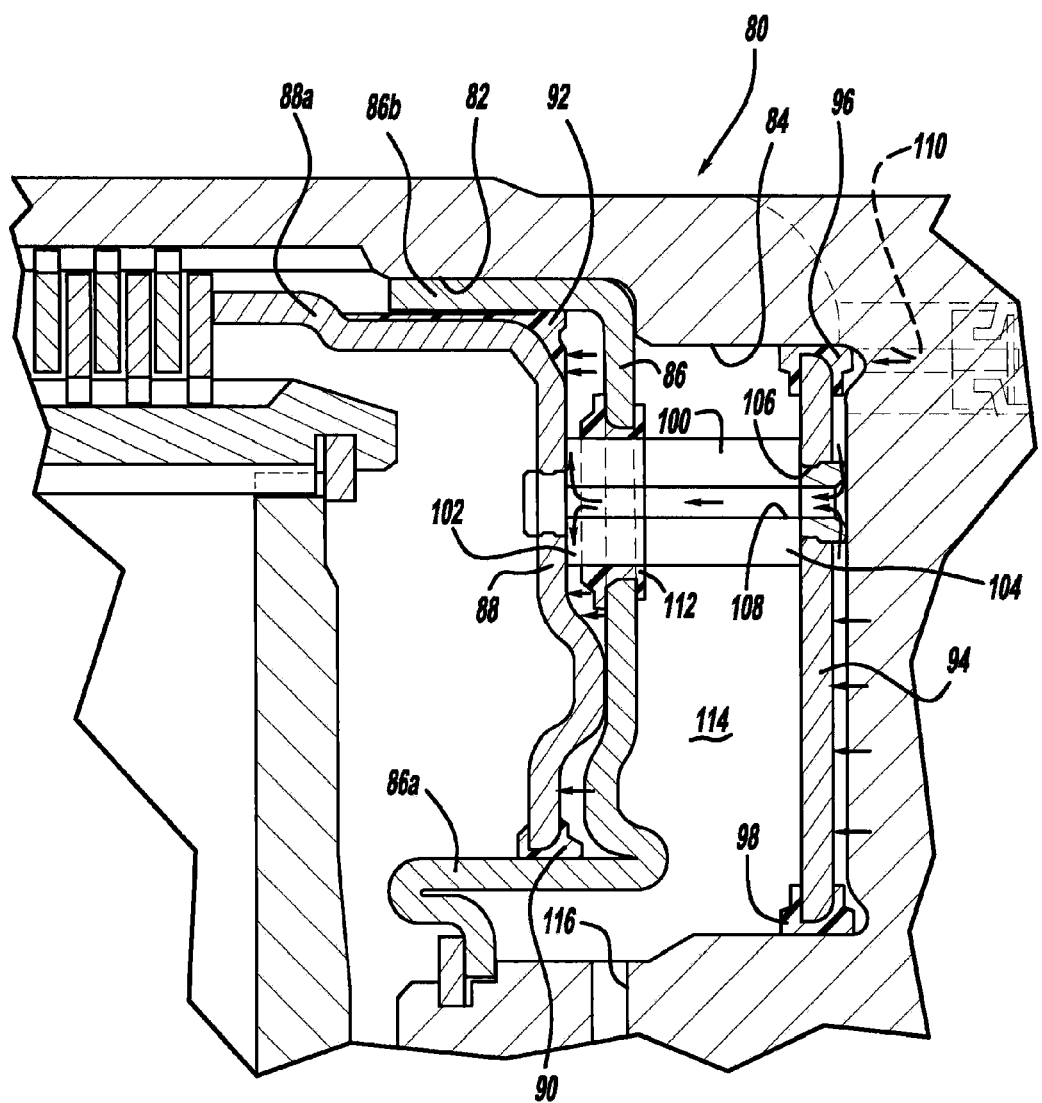
FIG. 4 is a partial cross-sectional view of a second embodiment of a clutch piston amplifier assembly according to the principles of the present invention.

With reference to FIG. 4, an alternative arrangement of the clutch piston amplifier assembly 80 will now be disclosed. As illustrated in FIG. 4, the piston amplifier assembly 80 is utilized for engaging a clutch pack 16 for engaging a first member 12 and a second member 14 in the same manner as described with reference to FIG. 1. Furthermore, the piston amplifier assembly 80 includes an apply piston chamber portion 82 and an amplifier piston chamber portion 84. A stage separator plate 86 is provided between the apply chamber portion 82 and the amplifier chamber portion 84. An apply piston 88 is disposed in the apply chamber portion 82 and includes an inner diameter seal 90 that engages a first axially extending portion 86a of the stage separator plate 86. An outer diameter seal 92 is provided on an outer diameter portion of the piston 88 and engages an inner diameter surface of a second axially extending portion 86b of the stage separator plate 86. The apply piston 88 includes an axially extending arm portion 88a which engages the clutch pack 16 for applying axial pressure thereto, in the same manner as apply piston 26 described with reference to FIG. 1.

An amplifier piston 94 is provided in the amplifier chamber portion 84 and includes an outer diameter seal 96 which engages an outer diameter surface of the piston chamber 84 and an inner diameter seal 98 which engages an inner diameter surface of the amplifier piston chamber 84. A plurality of amplifier drive pins 100 are provided in engagement with the apply piston 88 and the amplifier piston 94. Similar to the embodiment in FIG. 1, preferably three or more amplifier drive pins 100 are provided equally spaced around the annular shaped piston chamber so as to have a first end 102 engaging the apply piston 88 and having a second end 104 engaging apertures 106 provided in the amplifier piston 94. The amplifier drive pins 100 are provided with a through passage 108 extending therethrough so as to communicate pressurized fluid between the apply side of the amplifier piston 94 and the apply side of the apply piston 88 as illustrated by the force arrows therein. The first end 102 of the drive pins 100 are provided with grooves to allow radial flow of pressurized fluid from passage 108 into the apply chamber. The second end 104 of the drive pins 100 may be provided with similar grooves. With the communication passage 108 provided in the amplifier drive pins 100, only a single fluid inlet port 110 is necessary for supplying pressurized fluid to both the piston chambers 82, 86. In other words, by supplying pressurized fluid to the amplifier piston chamber 84, the pressurized fluid travels through passage 108 of the amplifier pins 100 and enters the apply piston chamber 82. The pressurized fluid acts on both the apply piston 88 and amplifier piston 94 with the stage separator plate 86 serving to isolate the pressurized fluid acting on the apply piston 88 from the amplifier piston chamber 84.

Figure 5:
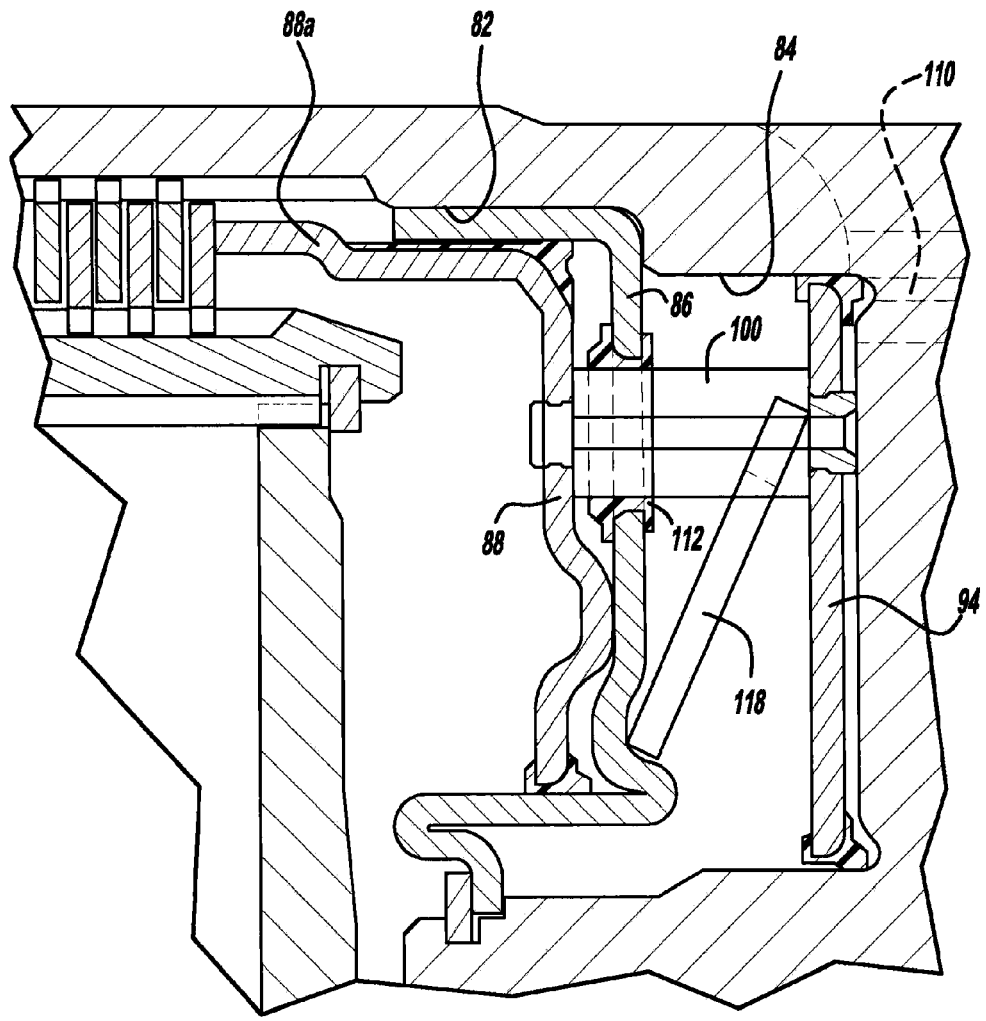
FIG. 5 is a partial cross-sectional view of a third embodiment of the clutch piston amplifier assembly according to the principles of the present invention.
Figure 6:
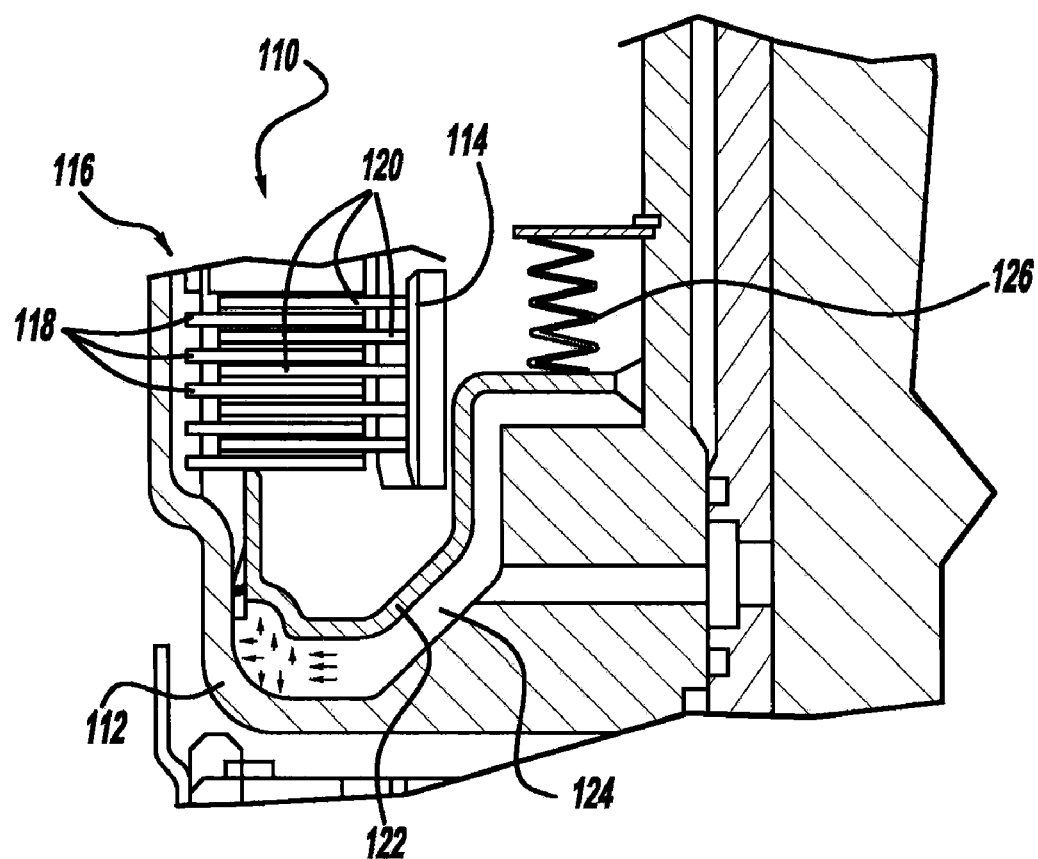
FIG. 6 is a cross-sectional view of a prior art clutch design.

Additional seals 112 are provided between the amplifier drive pins 100 and the apertures in the stage separator plate 86. A fluid return chamber is defined between the stage separator plate 86 and the amplifier piston 94. The return chamber 114 is supplied with pressurized fluid via inlet passage 116 which can be provided with hydraulic fluid or pressurized gas for returning the amplifier piston 94 and apply piston 88 to a disengaged position. As an alternative as shown in FIG. 5, a return spring 118 can be utilized in place of the fluid return configuration shown in FIG. 4 in order to return the apply piston 88 and amplifier piston 94 to the disengaged position.

The clutch piston amplifier assembly of the present invention increases the apply forces that can be achieved with the clutch pack. This is done by increasing the working surface area of the piston assembly by stacking the piston stages. There is no need to increase the piston diameters or line pressure in order to achieve the increased apply forces. The system of the present invention allows use of higher apply forces with the same or lower hydraulic pressures. The present invention also allows the ability to tune the booster piston for desired apply forces. The use of the present invention also allows the possibility of smaller diameter pistons which would potentially increase the ground clearance of the transmission unit.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clutch assembly, comprising:
    a first member;

a second member rotatable relative to said first member;

a clutch pack including at least one first clutch disc attached to said first member and at least one clutch disc attached to said second member;

a piston chamber adjacent to said clutch pack, said piston chamber including an inner diameter shoulder and an outer diameter shoulder;

a dual piston assembly disposed in said piston chamber including a first piston operable for applying axial pressure to said clutch pack and a second piston operable for applying axial pressure to said first piston; and a separator plate disposed against said inner diameter shoulder and said outer diameter shoulder of said piston chamber for separating a first chamber portion from a second chamber portion, said first piston being disposed in said first chamber portion and said second piston being disposed in said second chamber portion.

2. The clutch assembly according to claim 1, further comprising at least one drive member connected between said first piston and said second piston.

3. The clutch assembly according to claim 2, wherein said at least one drive member extends through an opening in said separator plate.

4. The clutch assembly according to claim 1, wherein said first and second pistons each include an inner diameter seal and an outer diameter seal engaging said piston chamber.

5. The clutch assembly according to claim 2, wherein said at least one drive member is received in an aperture in said second piston and includes a shoulder portion against which said second piston abuts.

6. The clutch assembly according to claim 3, wherein said opening in said separator plate includes a seal engaging said at least one drive member.

7. The clutch assembly according to claim 1, further comprising a return spring acting on one of said first and second pistons.

* * * * *